(12) United States Patent
Shackelford

(10) Patent No.: US 7,310,735 B1
(45) Date of Patent: Dec. 18, 2007

(54) METHOD, SYSTEM, AND PROGRAM FOR DISTRIBUTING SOFTWARE BETWEEN COMPUTER SYSTEMS

(75) Inventor: David Michael Shackelford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 09/409,617

(22) Filed: Oct. 1, 1999

(51) Int. Cl.
*G06F 11/30* (2006.01)
*G06F 12/14* (2006.01)
*G06F 7/04* (2006.01)
*G06F 17/30* (2006.01)
*H04L 9/32* (2006.01)
*G06K 9/00* (2006.01)
*H03M 1/68* (2006.01)

(52) U.S. Cl. .................. 713/189; 713/191; 713/193; 705/59; 726/26; 726/27

(58) Field of Classification Search ............... 713/191, 713/189
See application file for complete search history.

(56) References Cited

U.S. PATENT DOCUMENTS

| | | | |
|---|---|---|---|
| 4,799,061 A | | 1/1989 | Abraham et al. |
| 5,048,085 A | | 9/1991 | Abraham et al. |
| 5,148,481 A | | 9/1992 | Abraham et al. |
| 5,182,770 A | * | 1/1993 | Medveczky et al. .......... 705/56 |
| 5,343,527 A | | 8/1994 | Moore |
| 5,361,356 A | | 11/1994 | Clark et al. |
| 5,375,169 A | | 12/1994 | Seheidt et al. |
| 5,473,692 A | * | 12/1995 | Davis .......................... 705/59 |
| 5,495,411 A | * | 2/1996 | Ananda ........................ 705/32 |
| 5,553,139 A | * | 9/1996 | Ross et al. ..................... 705/59 |
| 5,748,744 A | | 5/1998 | Levy et al. |

(Continued)

FOREIGN PATENT DOCUMENTS

EP 0849657 6/1998

OTHER PUBLICATIONS

Bruce Schneier, Applied Crytography, 1996, John Wiley & Sons Inc., pp. 44-46.*

(Continued)

*Primary Examiner*—Benjamin E. Lanier
(74) *Attorney, Agent, or Firm*—David W. Victor; Konrad Raynes & Victor LLP

(57) ABSTRACT

Disclosed is a system, method, and program for distributing computer software from a first computer system. The first computer system receives a request for software from a second computer system. In response, the first computer system generates a message, encrypts the generated message, and transmits the encrypted message to the second computer system. The first computer system later receives an encrypted response from the second computer system and processes the encrypted response to determine whether the second computer system is authorized to access the software. The second computer system is permitted access to the software after determining that the second computer system is authorized to access the software. To access the computer software with the second computer system, the second computer system transmits a request for the software to the first computer system. The second computer system receives an encrypted message from the first computer system and processes the encrypted message to generate a response message. The response message is transmitted to the first computer system. In response, the second computer system is permitted access to the requested software.

40 Claims, 3 Drawing Sheets

U.S. PATENT DOCUMENTS

| | | | |
|---|---|---|---|
| 5,757,913 A | | 5/1998 | Bellare et al. |
| 5,799,088 A | | 8/1998 | Raike |
| 5,982,899 A | | 11/1999 | Probst |
| 5,991,307 A | * | 11/1999 | Komuro et al. ............. 370/473 |
| 5,991,402 A | * | 11/1999 | Jia et al. ........................ 705/59 |
| 6,131,088 A | * | 10/2000 | Hill .............................. 705/27 |
| 6,195,432 B1 | * | 2/2001 | Takahashi et al. .......... 380/277 |

OTHER PUBLICATIONS

Kalisk and Robshaw, The Secure Use of RSA, Cryptobytes—The Technical Newsletter of RSA Laboratories; Autumn 1995.

IBM Technical Disclosure Bulletin, System for M of N Component Part RSA Digital Signature Generation, vol. 40, No. 04, Apr. 1997.

IBM Technical Disclosure Bulletin, High Integrity Distributed Configuration Management, vol. 37, No. 09, Sep. 1994.

IBM Technical Disclosure Bulletin, IBM Digital Signature System and RS Private Key Format, vol. 39, No. 12, Dec. 1996.

* cited by examiner

METHOD, SYSTEM, AND PROGRAM FOR DISTRIBUTING SOFTWARE BETWEEN COMPUTER SYSTEMS

BACKGROUND OF THE INVENTION

1. Field of the Invention

The present invention relates to a method, system, and program for distributing computer software over a network and, in particular, limiting distribution to authorized systems.

2. Description of the Related Art

During installation, software programs may determine the configuration and identity of the hardware on which they are being installed. Such configuration information can be determined from a configuration file, such as a Windows ".INI" program or from issuing a request for configuration data. Software programs often determine the hardware on which they are being installed to determine the hardware specific settings to select for installation and execution.

Software companies often make their software available for free over a network, such as the Internet, bulletin board, FTP site, etc. Alternatively, a software company can allow someone to download for free the software, but require an access code to complete installation of the freely downloaded software. Requiring the access code discourages users from downloading and using the software because they must go through additional steps of registering and obtaining the access code. Further, users may forget their access code when they want to access the software at a later time.

Thus, there is a need in the art for an alternative distribution technique which allows authorized users to freely download, install and use the software without having to register to obtain access.

SUMMARY OF THE PREFERRED EMBODIMENTS

To overcome the limitations in the prior art described above, preferred embodiments disclose a system, method, and program for distributing computer software from a first computer system. The first computer system receives a request for software from a second computer system. In response, the first computer system generates a message, encrypts the generated message, and transmits the encrypted message to the second computer system. The first computer system later receives an encrypted response from the second computer system and processes the encrypted response to determine whether the second computer system is authorized to access the software. The second computer system is permitted access to the software after determining that the second computer system is authorized to access the software.

To access the computer software with the second computer system, the second computer system transmits a request for the software to the first computer system. The second computer system receives an encrypted message from the first computer system and processes the encrypted message to generate a response message. The response message is transmitted to the first computer system. In response, the second computer system is permitted access to the requested software.

In further embodiments, the software may comprise either computer programs, data, text, images, sound, and video.

In still further embodiments, the message may include a random component to include within the message.

In public/private key encryption embodiments, the first computer system may encrypt the message with a private key of the first computer system. The first computer system maintains a private key that is the only key capable of being decrypted by a public key associated with the first computer system. The encrypted response is encrypted with a private key of the second computer system. The first computer system maintains a public key associated with the second computer system that is the only key capable of decrypting the encrypted message.

Preferred embodiments provide a method, system, and program for distributing software, such as software programs, using encryption techniques to ensure that the computer system requesting the software is authorized to access and use the software. Preferred embodiments allow a software company to make conveniently and freely available software from a publicly accessible site, such as an Internet Web site, and still only allow authorized users to access and use the software. With preferred embodiments, the software company may verify that the party requesting the software is authorized without requiring the requestor to separately obtain an access code. In this way, authorized users have convenient, easy and seamless access to the software.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Limitations of Current Software Distribution Techniques

Currently, software companies often distribute their software free over the Internet or some other distribution channel. However, with such distribution techniques it is often very difficult for the software company to control how their software is ultimately distributed. For instance, a company selling software may want to insure that only those who purchased a specific model and brand of hardware may install the software. Such a situation may arise where a software company enters into an agreement with a hardware manufacture to make their software available to all purchasers of the hardware.

One solution would be for the software distribution server to read configuration information from the system requesting the software. The distribution server would only provide the requested software for installation after determining that the requesting system is authorized to receive the software, i.e., the hardware vendor is licensed to use the software. One problem with this technique is that third parties can observe the configuration information the hardware is returning and based on such observation determine what to return to cause the software to install on unauthorized hardware.

There is thus a need in the art for one computing system to securely verify that information is coming from an authorized source before providing computational resources to the requesting device.

Computing Environment

Figure 1:
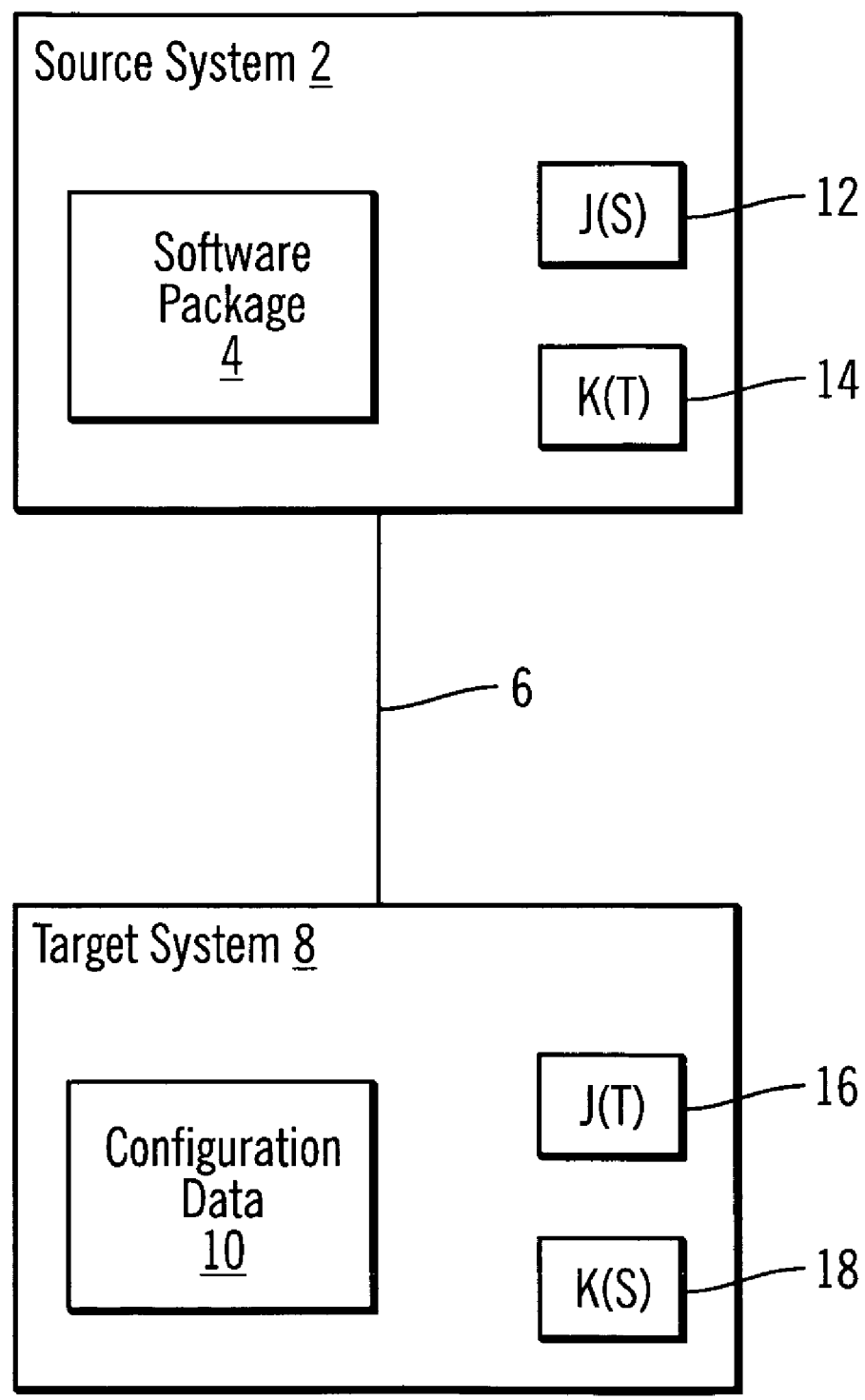
FIG. 1 is a block diagram illustrating a computing environment in which preferred embodiments of the present invention are implemented.

FIG. 1 illustrates a computing environment in which preferred embodiments are implemented. A source system 2 includes a software package 4 that is made available in response to requests from authorized systems over a network 6. The software package 4 may be an executable installation program to install a specific program when executed. In preferred embodiments the source system 2 comprises a server suited for distributing software in response to requests from external systems, and may utilize network protocols known in the art for distributing data, such as the Hypertext Transfer Protocol (HTTP) or File Transfer Protocol (FTP). The network 6 may be a TCP/IP network, such as the Internet and World Wide Web, or any other network system known in the art, e.g., LAN, Ethernet, WAN, System Area Network (SAN), Token Ring, etc.

A software company may manage the source system 2 to provide the software package 4 for installation and use on hardware from companies that are licensees of the software company. This would allow purchasers of hardware from licensees to continually access and install the software package 4 on the hardware.

A target system 8 may comprise any computer device connected to the network 6 that is authorized to access and install the software package 4. The target system 8 includes configuration data 10 that includes identity information for the target system 8. The source 2 and target 8 systems include each other's public/private key pair to send messages. Preferred embodiments utilize public key cryptography standards known in the art. In such embodiments, there are two keys, a public key and private key, and either can encrypt or decrypt data. A user maintains a private key and distributes public keys to others. The user can then encrypt messages with the private key and send to others having the public key. The recipients may use their public key to decrypt the message from the holder of the private key or use the public key to encrypt a message to send to the holder of the corresponding private key to decrypt. A public key algorithm is the algorithm used for encrypting and decrypting data with the public and private keys. Public key algorithms include the Rivest, Shamir, and Adleman (RSA) algorithm, or may include any public key encryption algorithm known in the art, such as Diffie and Hellman. Further details of public key encryption is described in the publication "An Overview of the PKCS Standards," RSA Laboratories Technical Note, by Burton S. Kaliski, Jr. (1993) and "Handbook of Applied Cryptography," by Alfred J. Menezes, Paul C. van Oorschot, and Scott A. Vanstone (1996), which publications are incorporated herein by reference in their entirety.

A message encrypted with a private key can only be decrypted with the corresponding public key of the key pair, which the holder of the private key typically makes freely available. A message encrypted with a public key can only be decrypted with the corresponding private key, which the holder of the private key maintains for its own use and secures to prevent others from accessing.

The source system 2 includes its own private key 12 J(S) and the target system's 8 public key 14 K(T) and the target system 8 includes its own private key 16 J(T) and the source system's 2 public key 18 K(S). In preferred embodiments, the source system 2 would include the public keys K(T)s of all systems authorized to access the software. This allows the source system 2 to verify that a request for software is originating from an authorized system.

Preferred embodiments seek to address the concern that a third party could monitor the messages between an authorized licensee, such as target system 8, and the source system 2 to determine the response the target system 8 presents to cause the source system 2 to provide the software package 8. Preferred embodiments address this problem by adding a random component to the message to make it unfeasible or extremely unlikely that an unauthorized third party could determine the message that is allowing the authorized target system 8 to obtain the software package 4 from the source system 2.

Figure 2:
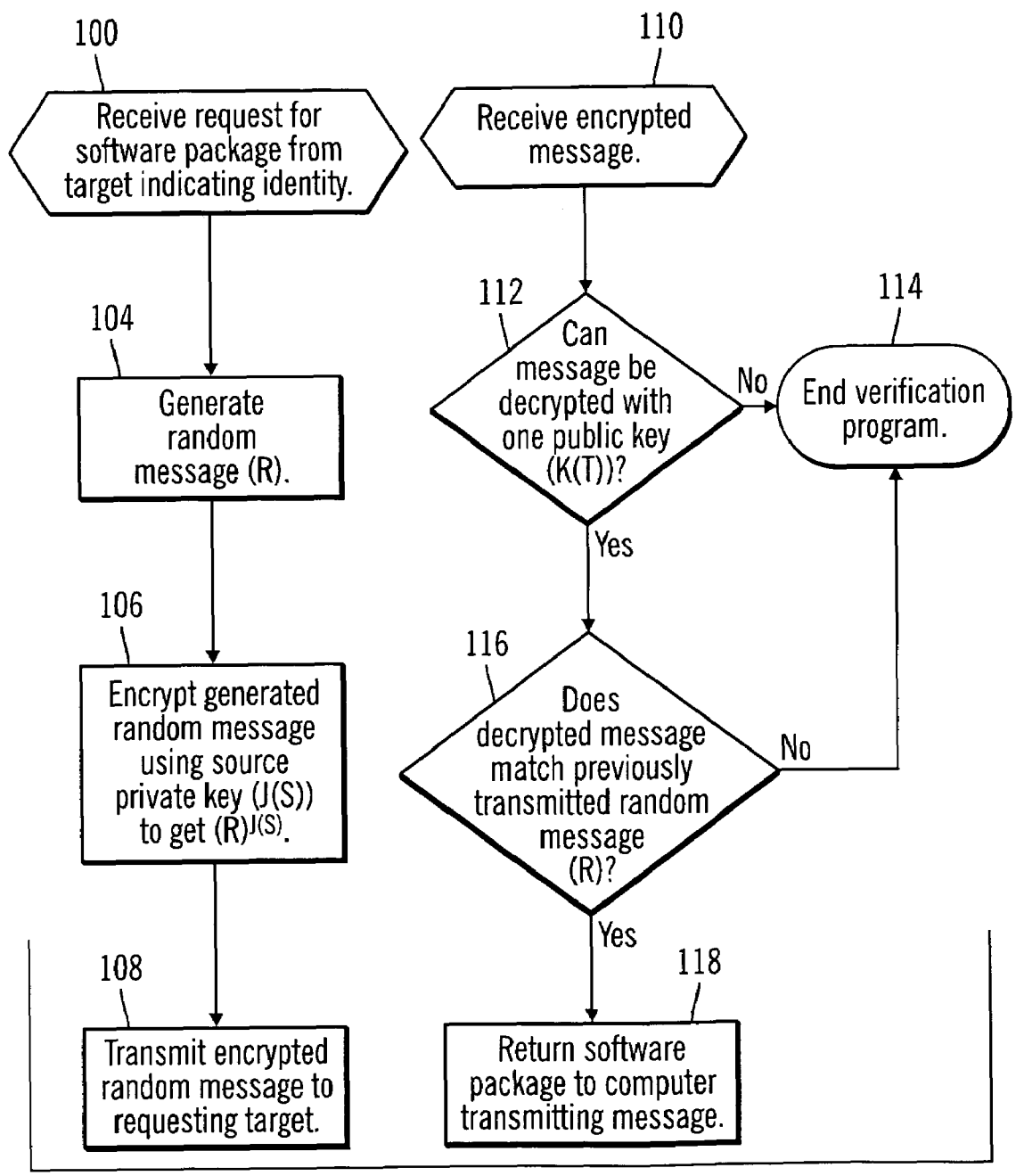
FIG. 2 illustrates logic implemented in a source system to handle a request for a software package in accordance with preferred embodiments of the present invention.
Figure 3:
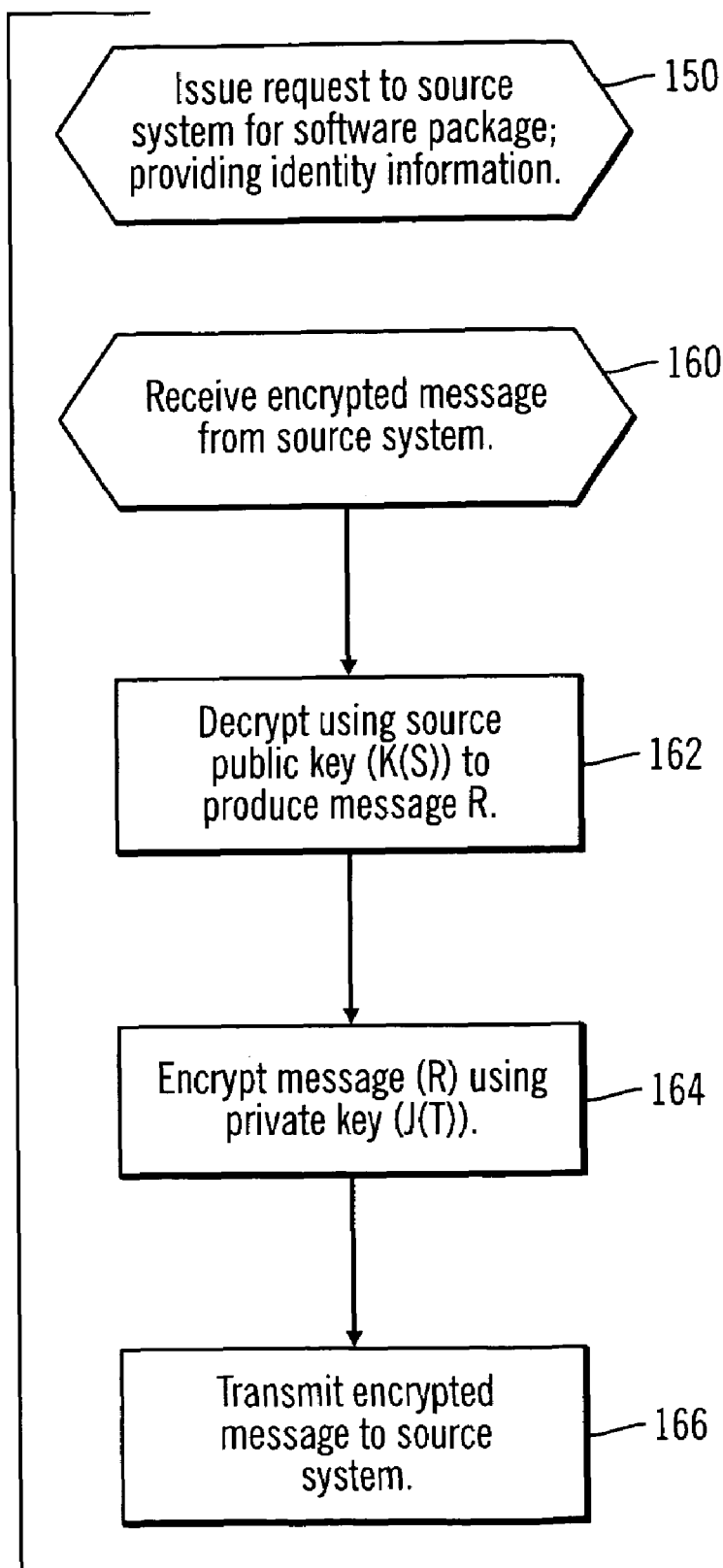
FIG. 3 illustrates logic implemented in a target system requesting the software package from the source system in accordance with preferred embodiments of the present invention.

FIGS. 2 and 3 illustrate logic implemented in the source 2 and target 8 systems, respectively, in accordance with a first preferred embodiment in which the source system 2 determines whether to return the software package 4 to the requesting target system 8. With respect to FIG. 2, control begins at block 100 with the source system 2 receiving a request for the software package 4 from the target 8 indicating its identity. This request would be generated by the target system 8 at block 150 in FIG. 3. The source system 2 then generates (at block 104) a random message (R) using known random or pseudo random generation techniques in the art. Alternatively, the message R may be generated as a time stamp which is inserted at an offset within the message to further randomize. The source system 2 encrypts (at block 106) the generated random message (R) with its private key J(S) to produce the encrypted message $(R)^{J(S)}$. This message is then transmitted (at block 108) to the target system 8.

With respect to FIG. 3, the target system 8 receives (at block 160) the encrypted message from the source system 2 and decrypts (at block 162) using the source public key K(S) to produce the message (R). The target system 8 can be assured that the message originated from the actual source system 2 because the source public key K(S) can only decrypt messages encrypted with the source private key J(S) that only the source system 2 maintains. In preferred embodiments, the vendor of the target system 8 would include in the target system 8 the public key of the source K(S) to allow the target system 8 to access the software package 4. The target system 8 then encrypts (at block 164) the message (R) using the its private key J(T) 16 and transmits (at block 166) the encrypted message to the source system 2.

At block 110 in FIG. 2, the source system 2 receives the encrypted message from the target system 8, and then determines (at block 112) whether it has one target public key K(T) that can decrypt the message. If not, then the verification program ends without the source system 2 transmitting the software package 4. Otherwise, if the message can be decrypted, then the source system 2 determines whether the decrypted message matches a previously transmitted random message (R). If not, then the program ends at block 114. Otherwise, the source system 2 returns (at block 118) the software package 4 to the target system 8.

With the logic of FIGS. 2 and 3, the source system can be assured that an authorized target system 8 initiated the message because only an authorized target could have encrypted a message with a private key that the source system 2 could decrypt with the public key K(T) of an authorized target. Moreover, by randomizing the content of the message used to verify the identity of the target 8, the source system 2 makes it extremely difficult for a third party to determine the content of the message being passed because the encrypted message constantly changes as a result of the random content. Further, the only way to feasiblely break the code would be for some third party to fraudulently obtain the target private key J(T) 16 and then operate as an authorized target system 8. However, this may be difficult to accomplish if the target systems 8 takes precautions to prevent unauthorized access to their private keys and if the target system 8 obtains new public/private key pairs regularly, such that any fraudulently obtained keys would only be valid for a limited duration.

In a second embodiment, the source system 2 may build a request for configuration data 10 (RCD) from the target system 8, and pad this request with a random number sequence or time of day stamp (R) as discussed above to produce the message RCD•R. The source system 2 would then encrypt this message with its private key J(S) 12 to produce $(RCD\cdot R)^{J(S)}$ and send the request for identification to the target system 8. The target system would then decrypt the message with the source public key K(S) 18. Decrypting the message with the source public key K(S) 18 allows the target system 8 to verify that the sender of the message is in fact the source system 2, and not some third party trying to trick the target system 8 into transmitting information on what it sends to obtain the software package 4. After decrypting the message, the target system 8 would read the request for configuration data and then retrieve configuration data (CD) 10 and append this to the message to produce RCD•R•CD. The target system 8 would then encrypt this message with its private key J(T) 16 to produce $(RCD\cdot R\cdot CD)^{J(T)}$ and send this encrypted message to the source system 2.

The source system 2 would decrypt this message with the authorized target public key K(T) 14 and receive the configuration data 10. If the configuration data 10 indicates an authorized target system 8, then the source system 2 would transmit the software package 4 to the target system 8. The source system 2 is assured that the configuration data came from the authorized target because the source system 2 used the public key K(T) of the authorized target to decrypt, and this public key would only decrypt a message encrypted with the target's private key J(T) 16, which is only maintained by the authorized target 8. Further, padding the message with random data, makes it unfeasible for a third party to determine the content of the message that is causing the source system 2 to transmit the software package 4. Thus, in the above two embodiments, the encryption/decryption protocol assures the source system 2 that the requestor of the software package 4 is an authorized licensee and not an unauthorized party.

As discussed, the source system 2 may maintain a target public key K(T) for each target system authorized to access the software. The target system 8 could include unencrypted identification information with the encrypted message for the source system 2 to use to select the appropriate public key K(T) to use to decrypt the message.

In preferred embodiments, the transmission of the software package 4 may require the automatic installation of the package on the target system 8. Once the software is installed the package 8 is preferably designed such that it cannot be used again. Alternatively, after the source system 2 verifies the identity of the target 8 as an authorized system, then the source system 2 could proceed to install the software package 4 without actually transmitting a self-installing software package 4. Such schemes would prevent an authorized target from redistributing the software package 4 to unauthorized parties. Alternatively, the source system 2 may maintain different software packages 4 tailored to each authorized system. Any attempt to install the software package 4 on hardware other than licensed hardware would cause an invalid installation as the software package 4 is narrowly designed to only work properly on the authorized hardware.

The above secured transmission techniques allow software distributors to ensure that only hardware vendors who are authorized licensees of the source system 2 owner can obtain and install the software package 4. The preferred embodiments allow software distributors to make software conveniently accessible from over a common network 6 such as the Internet and, at the same time, ensure that only certain authorized platforms may access the software package 4.

CONCLUSIONS AND ALTERNATIVE EMBODIMENTS

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications that may be made to this configuration without departing from the scope of the present invention.

Preferred embodiments were described with respect to distributing and installing computer programs. In alternative embodiments, the distributed software may comprise data other than programs, such as text, images, sound, video, etc.

Preferred embodiments were described with respect to a target system 8 that comprises hardware. However, in alternative embodiments, the target system 8 may comprise a software component within a computer. In such case, the software component would include the logic of FIG. 3 to communicate with the source system 2 and the discussed public and private keys. In this way, if a user installs an authorized target software product, then the user could use this installed software product to access the software package 4. This would allow a software company to take advantage of the preferred embodiments to distribute updates or related products to only those users who purchase the software company's software or software from a licensee of the software company. The term software company as used herein refers to any developer and distributor of software, including commercial, non-profit, governmental, etc.

Preferred embodiments were described with respect to a specific encryption protocol. However, in alternative embodiments the encryption steps and operations can vary and the insertion of random sequences could vary. In this way, steps may be added, modified or removed from the logic of FIGS. 2 and 3 and still remain within the scope of the invention.

Preferred embodiments were described as verifying the identity of the computational entity requesting the software before providing the software to the computational entity. In alternative embodiments, the source system may distribute the software before verifying the authorization or identity of the requester to access the software. In such case, when the target system attempts to install or further access the software, it will then have to proceed through the verification protocol in accordance with the preferred embodiments.

In summary, preferred embodiments disclose a system, method, and program for distributing computer software from a first computer system. The first computer system receives a request for software from a second computer system. In response, the first computer system generates a message, encrypts the generated message, and transmits the encrypted message to the second computer system. The first computer system later receives an encrypted response from the second computer system and processes the encrypted response to determine whether the second computer system is authorized to access the software. The second computer system is permitted access to the software after determining that the second computer system is authorized to access the software. To access the computer software with the second computer system, the second computer system transmits a request for the software to the first computer system. The second computer system receives an encrypted message from the first computer system and processes the encrypted message to generate a response message. The response message is transmitted to the first computer system. In response, the second computer system is permitted access to the requested software.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for distributing computer software from a first computer system, comprising the first computer system performing:

maintaining keys of computer systems authorized to access software to be distributed;

receiving a request for software from a second computer system;

generating a message;

encrypting the generated message;

transmitting the encrypted message to the second computer system;

receiving an encrypted response from the second computer system;

determining whether there is one maintained key for the second computer system capable of decrypting the received encrypted response;

decrypting the encrypted response with the determined key if there is one determined key;

determining whether the decrypted response includes a part of the generated message transmitted to the second computer system, with wherein the second computer system is authorized to access the software if the decrypted response includes the part of the generated message and wherein the second computer system is not authorized to access the software if there is not one maintained key for the second computer system that is capable of decrypting the encrypted response or the decrypted response does not include the part of the generated message transmitted to the second computer system; and permitting the second computer system access to the software after determining that the second computer system is authorized to access the software.

2. The method of claim 1, wherein the software comprises software that is a member of a set of software types comprising computer programs, data, text, images, sound, and video.

3. The method of claim 1, further comprising transmitting the software to the second computer system after permitting access.

4. The method of claim 1, wherein generating the message further comprises generating a random component to include within the message, and wherein determining whether the decrypted response includes the part of the generated message comprises determining whether the decrypted response includes the random component.

5. The method of claim 4, wherein the random component is comprised of a time stamp.

6. The method of claim 4, wherein the time stamp is inserted at an offset into the message.

7. The method of claim 1, wherein the software comprises a computer program, further comprising automatically causing the installation of the computer software on the second computer system when the computer software is transmitted to the second computer system.

8. The method of claim 1, wherein processing the encrypted response further comprises determining whether a message included in the encrypted response matches the generated message, wherein the second computer is authorized to access the software if the message included in the encrypted response matches the generated message.

9. The method of claim 8, wherein encrypting the message comprises encrypting the message with a private key of the first computer system that is the only key capable of being decrypted by a public key associated with the first computer system, wherein the second computer system maintains the public key that is capable of decrypting messages encrypted with the first computer system's private key, wherein the encrypted response received from the second computer system is encrypted with the second computer system's private key, wherein the maintained keys comprise public keys from the authorized computer systems, wherein processing the encrypted response further comprises decrypting the encrypted response with one of the maintained public keys.

10. The method of claim 1, wherein the generated message includes a random component and a request for configuration data from the second computer system, wherein processing the encrypted response comprises determining whether the response includes configuration data for a system that is authorized to access the computer software.

11. The method of claim 10, wherein the generated message is encrypted with a private key of the first computer system wherein the first computer system maintains a private key that is the only key capable of being decrypted by a public key associated with the first computer system, and wherein the encrypted response is encrypted with a private key of the second computer system, wherein the maintained keys comprise public keys from authorized computer systems.

12. A method for accessing computer software from a first computer system with a second computer system, wherein the second computer system performs:
   providing a key to the first computer system capable of decrypting an encrypted response from the second computer system;
   transmitting a request for the software to the first computer system;
   receiving an encrypted message from the first computer system;
   processing the encrypted message to generate a response message including a part of the encrypted message;
   encrypting the response message, where the encrypted response message is capable of being decrypted by the provided key at the first computer system;
   transmitting the encrypted response message to the first computer system; and
   receiving access to the requested software in response to the encrypted response message.

13. The method of claim 12, wherein the software comprises software that is a member of a set of software types comprising computer programs, data, text, images, sound, and video.

14. The method of claim 12, wherein the received encrypted message is encrypted with a private key of the first computer system that is the only key capable of being decrypted by a public key associated with the first computer system, further comprising;
   decrypting the received encrypted message with the public key associated with the first computer system that is the only key capable of decrypting messages encrypted with the first computer system's private key;
   encrypting the decrypted message with the second computer system's private key; and
   transmitting the message encrypted with the second computer system's private key to the first computer system, wherein the key made available by the second computer system that is capable of decrypting the received encrypted response comprises the public key associated with the second computer system.

15. The method of claim 12, wherein the received encrypted message includes a random component and a request for configuration data from the second computer system, further comprising adding configuration data for the second computer system to the decrypted message before encrypting the message with the second computer system's private key.

16. A system for distributing computer software from a first computer system to a second computer system, wherein the first computer comprises:
   means for maintaining keys of computer systems authorized to access software to be distributed;
   means for receiving a request for software from the second computer system;
   means for generating a message;
   means for encrypting the generated message;
   means for transmitting the encrypted message to the second computer system;
   means for receiving an encrypted response from the second computer system;
   means for determining whether there is one maintained key for the second computer system capable of decrypting the received encrypted response;
   means for decrypting the encrypted response with the determined key if there is one determined key;
   means for determining whether the decrypted response includes a part of the generated message transmitted to the second computer system, wherein the second computer system is authorized to access the software if the decrypted response includes the part of the generated message and wherein the second computer system is not authorized to access the software if there is not one maintained key for the second computer system that is capable of decrypting the encrypted response or the decrypted response does not include the part of the generated message transmitted to the second computer system; and
   means for permitting the second computer system access to the software after determining that the second computer system is authorized to access the software.

17. The system of claim 16, wherein the software comprises software that is a member of a set of software types comprising computer programs, data, text, images, sound, and video.

18. The system of claim 16, further comprising means for transmitting the software to the second computer system after permitting access.

19. The system of claim 16, wherein the means for generating the message further comprises generating a random component to include within the message, and wherein the means for determining whether the decrypted response includes the part of generated message comprises determining whether the decrypted response includes the random component.

20. The system of claim 16, wherein the software comprises a computer program, further comprising means for automatically causing the installation of the computer software on the second computer system when the computer software is transmitted to the second computer system.

21. The system of claim 16, wherein the means for processing the encrypted response further comprises determining whether a message included in the encrypted response matches the generated message, wherein the second computer is authorized to access the software if the message included in the encrypted response matches the generated message.

22. The system of claim 21, wherein the means for encrypting the message comprises encrypting the message with a private key of the first computer system that is the only key capable of being decrypted by a public key associated with the first computer system, wherein the second computer system maintains the public key that is capable of decrypting messages encrypted with the first computer system's private key, wherein the encrypted response received from the second computer system is encrypted with the second computer system's private key, wherein the maintained keys comprise public keys from the authorized computer systems, wherein the means for processing the encrypted response further comprises decrypting the encrypted response with one of the maintained public keys.

23. The system of claim 16, wherein the generated message includes a random component and a request for configuration data from the second computer system, wherein processing the encrypted response comprises determining whether the response includes configuration data for a system that is authorized to access the computer software.

24. The system of claim 23, wherein the generated message is encrypted with a private key of the first computer system, wherein the first computer system maintains a private key that is the only key capable of being decrypted by a public key associated with the first computer system, and wherein the encrypted response is encrypted with a private key of the second computer system, wherein the maintained keys comprise public keys from authorized computer systems.

25. A system for accessing computer software from a first computer system with a second computer system, wherein the second computer system comprises:
- means for providing a key to the first computer system capable of decrypting an encrypted response from the second computer system;
- means for transmitting a request for the software to the first computer system;
- means for receiving an encrypted message from the first computer system;
- means for processing the encrypted message to generate a response message including a part of the encrypted message;
- means for encrypting the response message, wherein the encrypted response message is capable of being decrypted by the provided key at the first computer system;
- means for transmitting the encrypted response message to the first computer system; and
- means for receiving access to the requested software in response to the encrypted response message.

26. The system of claim 25, wherein the received encrypted message is encrypted with a private key of the first computer system that is the only key capable of being decrypted by a public key associated with the first computer system, further comprising;
- means for decrypting the received encrypted message with the public key associated with the first computer system that is the only key capable of decrypting messages encrypted with the first computer system's private key;
- means for encrypting the decrypted message with the second computer system's private key; and
- means for transmitting the message encrypted with the second computer system's private key to the first computer system, wherein the key made available by the second computer system that is capable of decrypting the received encrypted response comprises a public key associated with the second computer system.

27. An article of manufacture for use in distributing computer software from a first computer system the article of manufacture comprising computer storage media including at least one computer program embedded therein that causes the first computer system to perform:
- maintaining keys of computer systems authorized to access software to be distributed;
- receiving a request for software from a second computer system;
- generating a message;
- encrypting the generated message;
- transmitting the encrypted message to the second computer system;
- receiving an encrypted response from the second computer system;
- determining whether there is one maintained key for the second computer system capable of decrypting the received encrypted response;
- decrypting the encrypted response with the determined key if there is one determined key;
- determining whether the decrypted response includes a part of the generated message transmitted to second computer system, wherein the second computer system authorized to access the software if the decrypted response includes the part of the generated message and wherein the second computer system is not authorized to access the software if there is not one maintained key for the second computer system that is capable of decrypting the encrypted response or the decrypted response does not include the part of the generated message transmitted to the second computer system; and
- permitting the second computer system access to the software after determining that the second computer system is authorized to access the software.

28. The article of manufacture of claim 27, wherein the software comprises software that is a member of a set of software types comprising computer programs, data, text, images, sound, and video.

29. The article of manufacture of claim 27, further comprising transmitting the software to the second computer system after permitting access.

30. The article of manufacture of claim 27, wherein generating the message further comprises generating a random component to include within the message, and wherein determining whether the decrypted response includes the generated message comprises determining whether the decrypted response includes the random component.

31. The article of manufacture of claim 30, wherein the random component is comprised of a time stamp.

32. The article of manufacture of claim 31, wherein the time stamp is inserted at an offset into the message.

33. The article of manufacture of claim 27, wherein the software comprises a computer program, further comprising automatically causing the installation of the computer software on the second computer system when the computer software is transmitted to the second computer system.

34. The article of manufacture of claim 27, wherein processing the encrypted response further comprises determining whether a message included in the encrypted response matches the generated message, wherein the second computer is authorized to access the software if the message included in the encrypted response matches the generated message.

35. The article of manufacture of claim 34, wherein encrypting the message comprises encrypting the message with a private key of the first computer system that is the only key capable of being decrypted by a public key associated with the first computer system, wherein the second computer system maintains the public key that is capable of decrypting messages encrypted with the first computer system's private key, wherein the encrypted response received from the second computer system is encrypted with the second computer system's private key, wherein the maintained keys comprise public keys from the authorized computer systems, wherein processing the encrypted response further comprises decrypting the encrypted response with one of the maintained public keys.

36. The article of manufacture of claim 27, wherein the generated message includes a random component and a request for configuration data from the second computer system, wherein processing the encrypted response comprises determining whether the response includes configuration data for a system that is authorized to access the computer software.

37. The article of manufacture of claim 36, wherein the generated message is encrypted with a private key of the first computer system, wherein the first computer system maintains a private key that is the only key capable of being decrypted by a public key associated with the first computer system, and wherein the encrypted response is encrypted with a private key of the second computer system, wherein the maintained keys comprise public keys from authorized computer systems.

38. The article of manufacture of claim 27, the article of manufacture comprising at least one additional software program to cause the second computer system to perform:
   transmitting a request for the software to the first computer system;
   receiving an encrypted message from the first computer system;
   processing the encrypted message to generate a response message;
   transmitting the response message to the first computer system; and
   receiving access to the requested software in response to the response message.

39. The article of manufacture of claim 38, wherein the received encrypted message is encrypted with a private key of the first computer system that is the only key capable of being decrypted by a public key associated with the first computer system, further comprising;
   decrypting the received encrypted message with the public key associated with the first computer system that is the only key capable of decrypting messages encrypted with the first computer system's private key;
   encrypting the decrypted message with the second computer system's private key; and
   transmitting the message encrypted with the second computer system's private key to the first computer system, wherein the key made available by the second computer system that is capable of decrypting the received encrypted response comprises the public key associated with the second computer system.

40. The article of manufacture of claim 38, wherein the received encrypted message includes a random component and a request for configuration data from the second computer system, further comprising adding configuration data for the second computer system to the decrypted message before encrypting the message with the second computer system's private key.

* * * * *